United States Patent
Conyers et al.

(10) Patent No.: US 10,618,675 B2
(45) Date of Patent: *Apr. 14, 2020

(54) MOBILE SELF-LEVELING LANDING PLATFORM FOR SMALL-SCALE UAVS

(71) Applicant: COLORADO SEMINARY, which owns and operates the University of Denver, Denver, CO (US)

(72) Inventors: Stephen A. Conyers, Denver, CO (US); Nikolaos Vitzilaios, Denver, CO (US); Matthew J. Rutherford, Denver, CO (US); Kimon P. Valavanis, Denver, CO (US)

(73) Assignee: Colorado Seminary, which owns and operates the University of Denver, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,451

(22) Filed: May 20, 2019

(65) Prior Publication Data

US 2019/0291895 A1 Sep. 26, 2019

Related U.S. Application Data

(60) Continuation of application No. 16/011,264, filed on Jun. 18, 2018, now Pat. No. 10,343,794, which is a division of application No. 15/318,882, filed as application No. PCT/US2015/036770 on Jun. 19, 2015.

(Continued)

(51) Int. Cl.
*B64F 1/00* (2006.01)
*B64F 1/10* (2006.01)
*B60K 1/02* (2006.01)
*B62D 7/14* (2006.01)
*B64C 39/02* (2006.01)
*H02J 7/35* (2006.01)
*H02S 99/00* (2014.01)

(52) U.S. Cl.
CPC ............... *B64F 1/007* (2013.01); *B60K 1/02* (2013.01); *B62D 7/144* (2013.01); *B64C 39/024* (2013.01); *B64F 1/10* (2013.01); *H02J 7/35* (2013.01); *H02S 99/00* (2013.01); *B64C 2201/024* (2013.01); *B64C 2201/18* (2013.01); *B64C 2201/208* (2013.01)

(58) Field of Classification Search
CPC ... B64F 1/007; B64F 1/10; B60K 1/02; B62D 7/144; B64C 39/024; H02J 7/35; H02S 99/00
USPC ........................................... 180/233
See application file for complete search history.

(56) References Cited

U.S. PATENT DOCUMENTS 3,003,717 A * 10/1961 Booker .................... B64D 5/00
                                                  244/114 R
3,291,242 A * 12/1966 Tinajero .................. B60V 1/04
                                                  180/116

(Continued)

*Primary Examiner* — Jacob D Knutson
(74) *Attorney, Agent, or Firm* — Maschoff Brennan (57) ABSTRACT

A mobile self-leveling landing platform vehicle is disclosed that includes a landing surface and one or more wheel assemblies. Each wheel assembly includes a wheel, a control arm coupled with the wheel and the body of the landing platform vehicle, and an actuator coupled with the control arm and the body of the platform vehicle. Methods for self-leveling the landing platform vehicle are also disclosed.

2 Claims, 10 Drawing Sheets

Related U.S. Application Data

(60) Provisional application No. 62/019,130, filed on Jun. 30, 2014, provisional application No. 62/014,892, filed on Jun. 20, 2014.

(56) References Cited

U.S. PATENT DOCUMENTS

| | | | |
|---|---|---|---|
| 5,000,398 A * | 3/1991 | Rashev | B64C 27/08 244/110 E |
| 5,588,387 A * | 12/1996 | Tellington | B63B 1/14 114/261 |
| 7,568,658 B2 * | 8/2009 | Li | B64F 1/10 244/110 E |
| 2011/0017495 A1 * | 1/2011 | Tacken | H05K 3/184 174/250 |
| 2012/0056040 A1 * | 3/2012 | Brotherton-Ratcliffe | B64C 27/20 244/23 A |
| 2014/0126421 A1 * | 5/2014 | Lida | H04L 41/12 370/254 |
| 2017/0137150 A1 * | 5/2017 | Conyers | B64F 1/007 |
| 2019/0009925 A1 * | 1/2019 | Conyers | B64F 1/007 |

* cited by examiner

MOBILE SELF-LEVELING LANDING PLATFORM FOR SMALL-SCALE UAVS

This disclosure relates generally to mobile self-leveling landing platforms for small-scale unmanned aerial vehicles.

BACKGROUND

The ever-increasing popularity of autonomous Unmanned Aerial Vehicles (UAVs) for both military and civilian applications has created a need for increased autonomy in the deployment of UAVs in the field. Recent years have seen a significant increase in the capabilities of small (<150 kg) Vertical Take-Off and Landing (VTOL) UAVs. At the same time, these vehicles have become more accessible and less expensive. Despite the rapid growth, there have been few solutions offered to address the problem of launching and recovering UAVs without human intervention. One of the difficulties associated with VTOL aircraft is that they cannot land safely on slopped or uneven terrain. This is primarily due to the physics of rotorcraft UAVs in which the thrust force is always perpendicular to the landing gear, if the vehicle is oriented to match an uneven landing surface, the vehicle may not be able to maintain flight. Additionally, when the landing surface is uneven, there is a higher chance of touching the ground with one of the rotors, causing catastrophic failure of the vehicle. While a fixed-wing aircraft can operate on a sloped landing strip by taking off traveling down the slope and land while traveling back up the slope, VTOL aircraft cannot.

SUMMARY

A mobile self-leveling landing platform vehicle is disclosed that includes a landing surface and one or more wheel assemblies. Each wheel assembly includes a wheel, a control arm coupled with the wheel and the body of the landing platform vehicle, and an actuator coupled with the control arm and the body of the platform vehicle. Methods for self-leveling the landing platform vehicle are also disclosed.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed among other things for a self-leveling landing platform for a UAV.

Figure 1:
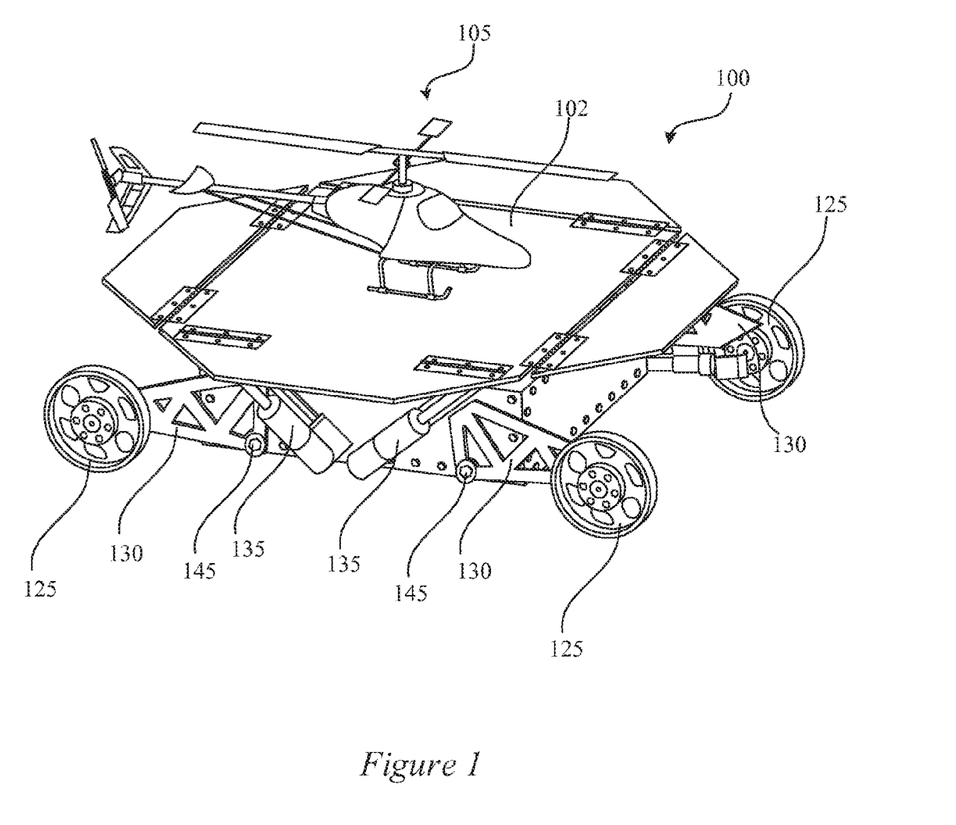
FIG. 1 illustrates a self-leveling landing platform with a UAV according to some embodiments.

FIG. 1 illustrates a self-leveling landing platform vehicle 100 with a UAV 105 according to some embodiments. The landing platform vehicle 100 may include a landing surface 102 and may be coupled with at least four actuating wheel assemblies. Each actuating wheel assembly may include a wheel 125 coupled with a control arm 130. Each control arm 130 may be independently actuated by a linear actuator 135. An actuating arm 136 of the linear actuator 135 may be coupled with the control arm 130 and the body of the landing platform vehicle 100. In some embodiments, each wheel may be placed at one of four corners of the landing platform vehicle 100. The linear actuators 135 may be independently actuated to raise and/or lower portions and/or corners of the landing platform vehicle 100 and/or to adjust the level of the landing surface 102.

By raising or lowering the height of each wheel 125 independently and/or in conjunction with one or more of the other wheels 125, the landing surface 102 can maintain a level surface regardless of the slope of the ground upon which it is placed. For example, the landing surface 102 may maintain a horizontal surface despite the landing platform vehicle 100 being on a slope up to 25 degrees regardless of the orientation of the landing platform vehicle 100.

Figure 2A:
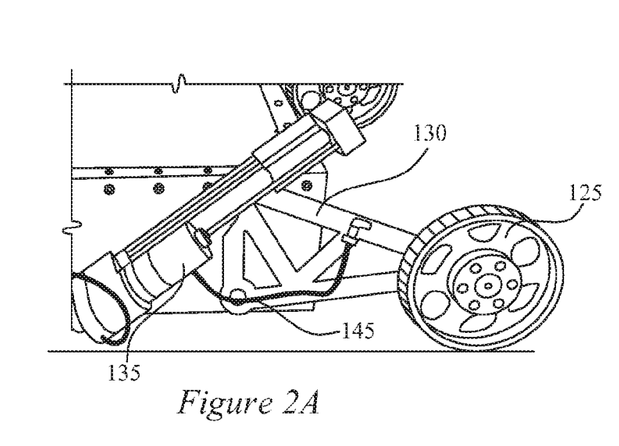
FIGS. 2A, 2B, 2C and 2D illustrate examples of the relationship between the linear actuator, the control arm and the wheel according to some embodiments.
Figure 2B:
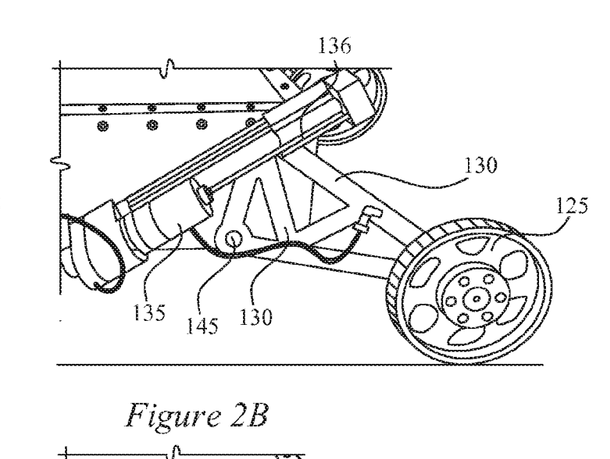
Figure 2C:
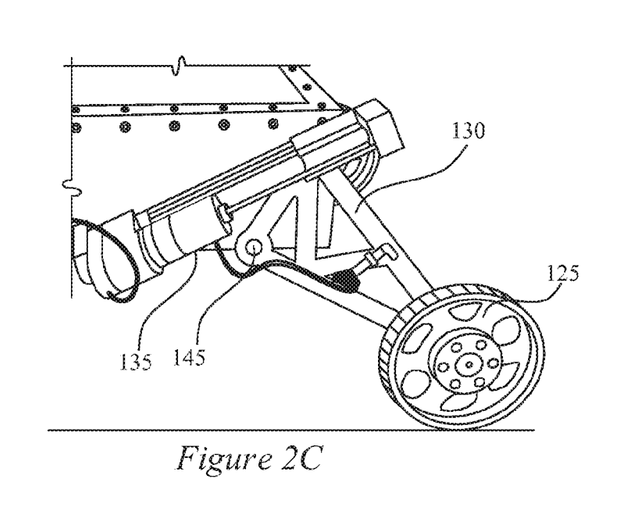
Figure 2D:
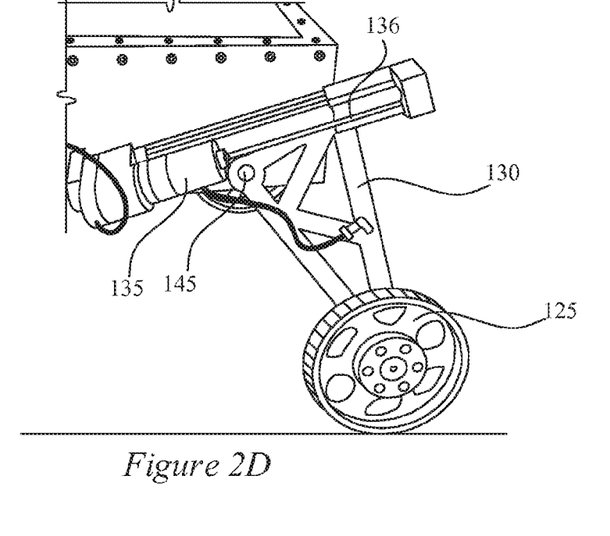

Each wheel 125 can be mounted on the end or near the end of the control arm 130. The control arm 130, for example, may pivot about a fulcrum 145 when actuated by the linear actuator 135. The linear actuator 135 may rotate the control arm 130 causing the associated wheel 125 to move up and down relative to the landing platform vehicle 100. FIGS. 2A, 2B, 2C and 2D illustrate examples of the relationship between the linear actuator 135, the control arm 130, and the wheel 125 according to some embodiments. In FIG. 2A the linear actuator 135 is not actuated and the wheel 125 is extended away from the landing platform vehicle 100 on the control arm 130. In FIG. 2B the linear actuator 135 is partially actuated causing the wheel 125 to move downward relative to the landing platform vehicle 100. In FIG. 2C the linear actuator 135 is actuated more than in FIG. 2B causing the wheel 125 to move downward relative to the landing platform vehicle 100. In FIG. 2D the linear actuator 135 is fully or near-fully actuated causing the wheel 125 to be positioned downward from the landing platform vehicle 100.

As shown FIGS. 2A, 2B, 2C, and 2D, positive actuation of a linear actuator 135 can cause an associated wheel 125 to move downwardly, which may cause a portion of the landing platform vehicle 100 and/or a portion of the landing surface 102 to move upwardly relative to the ground. Similarly negative actuation of the linear actuator 135 can cause an associated wheel 125 to move upwardly, which may cause a portion of the landing platform vehicle 100 and/or a portion of the landing surface 102 to move downwardly relative to the ground. By coordinating the positive and/or negative actuation of the linear actuators 135 a portion of the landing platform vehicle 100 and/or a portion of the landing surface 102 may change the angular orientation of the landing surface 102 relative to the horizon and/or may position the landing surface 102 into a level orientation in two dimensions.

Figure 3:
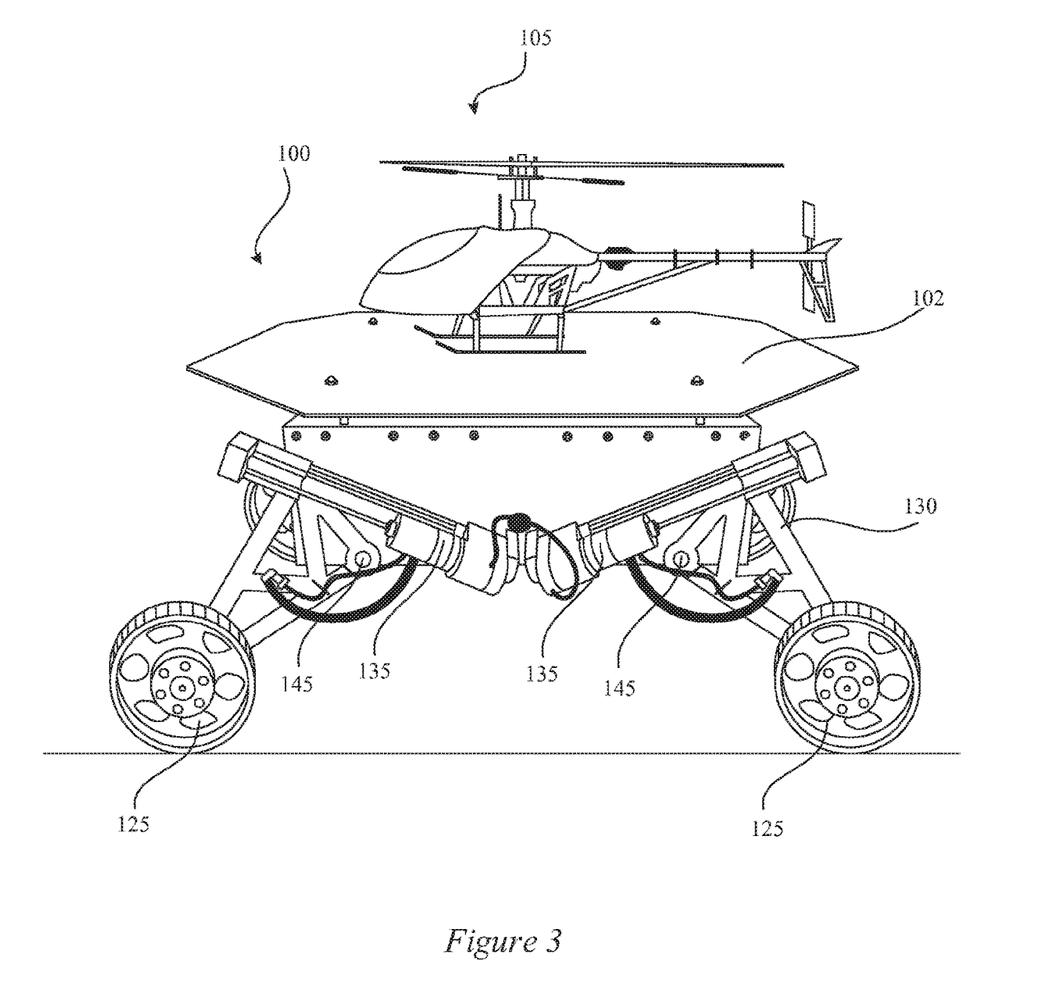
FIG. 3 illustrates another embodiment of a landing platform with a UAV according to some embodiments.

FIG. 3 illustrates another embodiment of a landing platform vehicle 100 with an unmanned aerial vehicle (UAV) 105 according to some embodiments.

In some embodiments, the landing surface of the landing surface 102 may include a plurality of solar cells that may be used to charge batteries and/or power various electrical components. When the UAV 105 may not be on the landing surface of the landing surface 102, the landing surface 102 may be angled and/or positioned, for example, so the solar panels may be optimized to collect sun rays such as at an angle that may be close to ninety degrees relative to the direction of the sun rays. For example, the power (e.g., voltage and/or current) produced by the solar cells may be monitored while the landing surface 102 is tilted. The landing platform vehicle 100 may find a tilt position of the landing surface 102 that produces an electrical power that is greater than other tilt positions.

Figure 4:
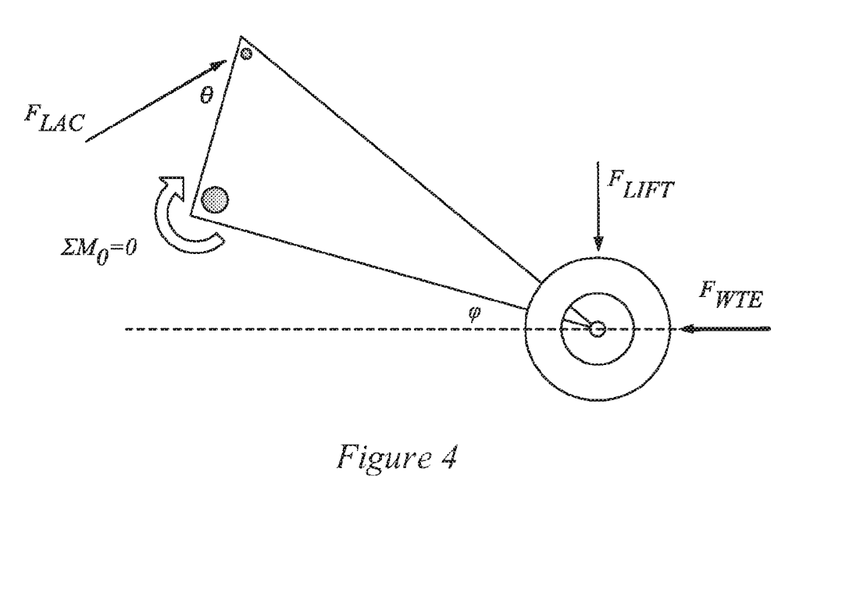
FIG. 4 illustrates a free body diagram of the control arm and actuator in the self-leveling system according to some embodiments.

FIG. 4 illustrates an example free body diagram of the control arm 130 and linear actuator 135 in the self-leveling system according to some embodiments. In the free body diagram, $F_{linear\ actuator\ controller}$ is the force provided by the linear actuator 135 on the control arm 130, $F_{WTE}$ is the force provided by the wheel motor that can rotate inward to provide additional force at low transmission angles, and $F_{LIFT}$ is the resulting lifting force that may be applied at the wheel 125 to lift the corner of the landing platform vehicle 100. The angle between the linear actuator 135 and the control arm 130 is represented by $\theta$ (theta) which is the transmission angle, and the angle between the control arm 130 and the ground is represented by $\varphi$ (phi). As the linear actuator 135 extends, the angle $\theta$ decreases and the angle $\varphi$ increases. Because these two angles may be dependent on one another, one can be written as a function of the other. The lifting force $F_{LIFT}$ is dependent on these angles, and changes as the control arm 130 moves through its range of motion according, for example, to the following:

$$F_{LIFT} = \frac{0.1(F_{LAC}\sin\theta) + 0.225(F_{WTE}\cos\varphi)}{0.225}$$

$$\theta = -0.558\varphi + 53.049 - 4.41° \leq \varphi \leq 76.48° \therefore 43.3N \leq F_{LIFT} \leq 188.9N$$

Figure 5:
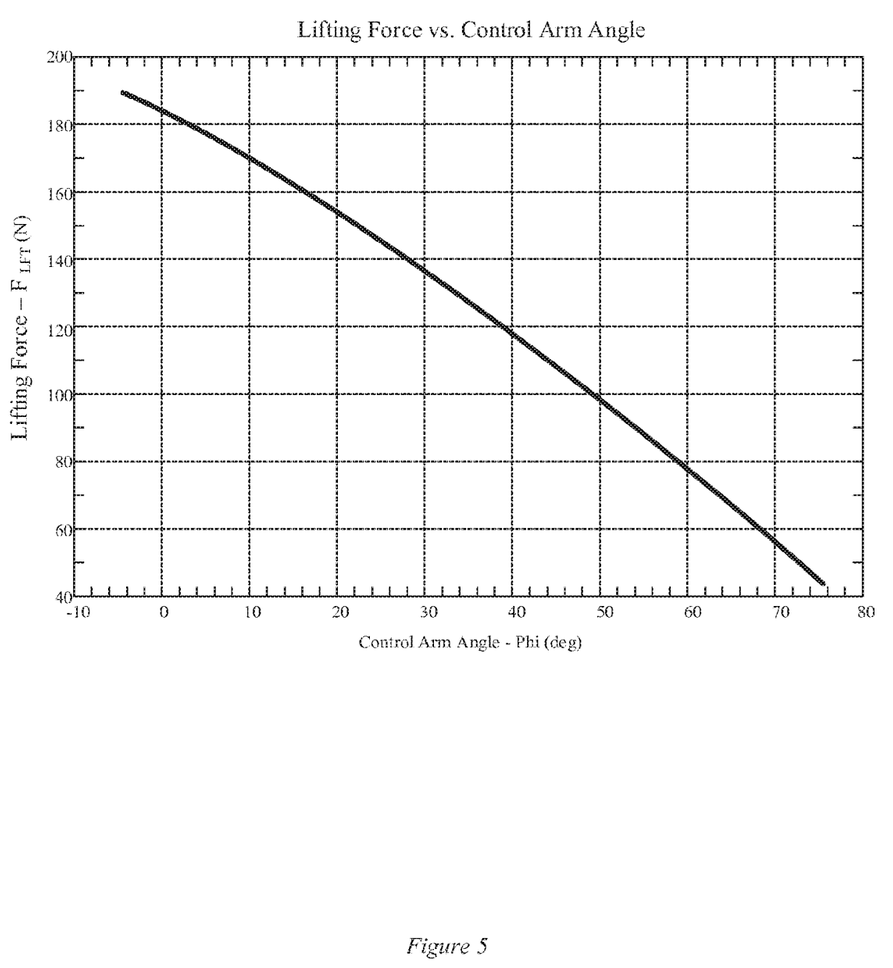
FIG. 5 graphically represents a plot of $F_{LIFT}$ vs. control arm angle for an example of a self-leveling system.

These values may change based on the weight and/or dimensions of the landing platform vehicle 100, each linear actuator 135, the control arm 130, etc. This relationship may be further illustrated, for example, in FIG. 5, which graphically represents a plot of $F_{LIFT}$ vs. control arm 130 angle (($\varphi$) for an example of a landing platform vehicle 100. In some embodiments, each linear actuator 135 may be individually controlled using a linear actuator controller. The linear actuator controller, for example, may include a standard controller. In some embodiments, each linear actuator 135 may be controlled by a separate linear actuator controller. In other embodiments, a central controller may act as the linear actuator controller for multiple linear actuators 135. In some embodiments, the linear actuator controller may allow each linear actuator 135 to operate like servomotors.

In some embodiments, a control signal, for example, may dictate the desired position set-point of a linear actuator 135 rather than the speed at which it moves. For example, a 1.0 kHz Pulse Width Modulation (PWM) signal may be used to control the position of each linear actuator 135 through the linear actuator controller, which may use internal potentiometer position feedback to achieve the desired extension length. The potentiometer position feedback may be built into each linear actuator 135, and may function by changing the electrical resistance (e.g., from 5 to 10 KΩ) between a reference wire and a signal wire depending on the amount of extension. A low voltage (e.g., 3.3 Volts) may be provided to the reference wire, and as the linear actuator 135 extends the resistance decreases and the voltage at the signal wire increases, according to Ohm's Law. The linear actuator controller may read the voltage at the position feedback signal wire, and determine how far the linear actuator 135 needs to extend or retract to reach the desired set-point set by the PWM signal. The duty cycle of the PWM signal can range, for example, from 0% to 100%, which may correspond to a position set-point ranging from fully-retracted to fully-extended respectively.

In some embodiments, a plurality of linear actuator controllers may be coupled with a processor (e.g., computational system 1000 in FIG. 10 or controller 805 in FIG. 8) to control the operation of the various linear actuators 135.

In some embodiments, each linear actuator controller may be a fully-functioning stand-alone closed-loop controller, which handles all of the calculations necessary to reach the desired position and maintain that extension length until the PWM input signal changes. The linear actuator controller, for example, may use a software based control algorithm, which allows all of the parameters of the controller to be tuned by the user. In some embodiments, this ability to tune each linear actuator controller individually to optimize the performance of its companion linear actuator 135 may be used to ensure that the landing surface 102 can remain within ±one degree of level. In some embodiments, all four linear actuators 135 may be the same model from the same manufacturer, although they may not all operate exactly the same right out of the box. This may be primarily due to the fact that the potentiometer feedback may not be identical in every linear actuator 135. For example, two similar or identical linear actuators 135 may be connected to similar or identical linear actuator controllers and given the same 50% PWM signal should both extend to exactly 50 mm. In reality, however, one linear actuator 135 might extend to 51 mm and the other to 48 mm. This small discrepancy may have an effect on the performance of the self-leveling system and drive system of the landing platform vehicle 100. In some embodiments, tuning the linear actuator controllers individually eliminates these types of problems.

The landing platform vehicle 100 may include a controller that can determine the present angle of the landing surface 102 with respect to flat ground (e.g., the horizon) in order to level the landing surface 102. In some embodiments, the landing platform vehicle 100 may include an inclinometer that measures the angles in the X- and Y-axes with respect to the direction of the Earth's gravitational pull. The data from the inclinometer readings can range from 0 to 180 degrees, with 90 degrees being considered perfectly level. In some embodiments, the angle of the X-axis corresponds to the incline between the front and back of the landing platform vehicle 100, and the Y-axis corresponds to the angle side-to-side. In other embodiments, the angle of the X-axis corresponds to the incline between one corner and a diagonal corner of the landing platform vehicle 100, and the Y-axis corresponds to the incline between a different corner and a diagonal corner of the landing platform vehicle 100. In some embodiments, the inclinometer may provide angle data as a voltage output such as, for example, from 0 to 5.0 Volts. The voltage may be proportional to the angle of that axis. The voltage outputs from the inclinometer may be converted into digital signals and sent to a controller. In some embodiments, the inclinometer may provide angle data as resistance or current values. In some embodiments, two values may be provided corresponding to each axis.

In some embodiments, each linear actuator 135 may provide a position feedback signal. In some embodiments, this signal may be a digital signal. In other embodiments, this signal may be an analog signal and may be converted from analog into digital signal. The position feedback signal may be used to determine which linear actuators 135 can be extended and which ones should be retracted to achieve the best level orientation. For instance, in some situations, raising one corner of the landing platform vehicle 100 can produce the same effect as lowering the opposite corner of the landing platform vehicle 100. Thus, if one linear actuator 135 may be already near full extension (all the way up), the controller can choose to lower that linear actuator 135 rather than raise a different linear actuator 135 and vice versa.

Figure 6:
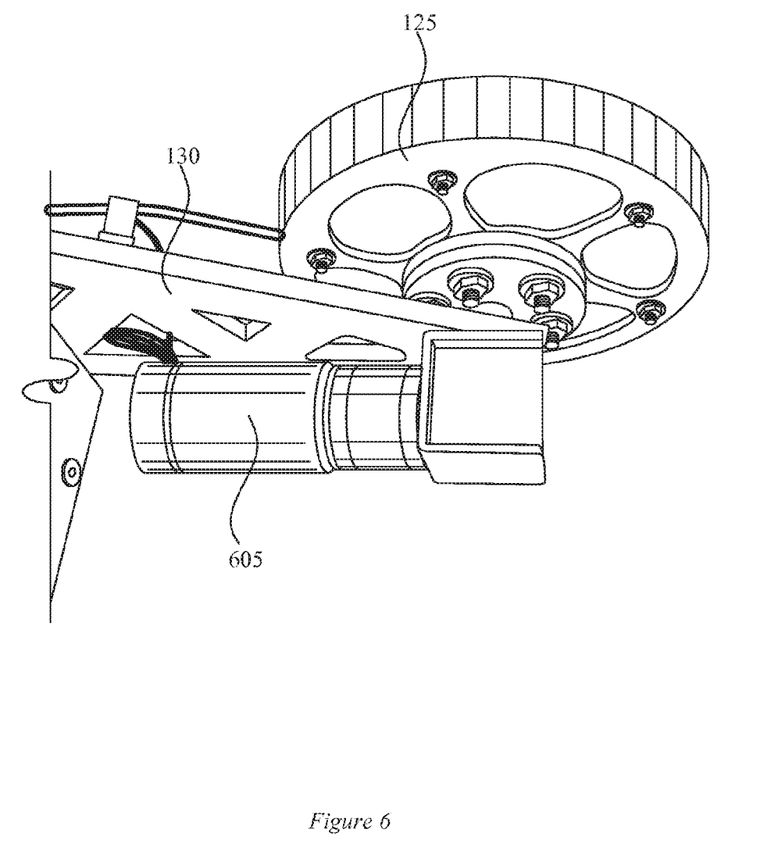
FIG. 6 illustrates a wheel motor and a wheel mounted to a control arm according to some embodiments.

The landing platform vehicle 100 may include a drive system. In some embodiments, the drive system may include four motors coupled with the four control arms 130 and the four wheels 125. In some embodiments, the drive system may be based on four-wheel differential drive architecture. For example, as shown in FIG. 6, each wheel 125 may be driven by its own motor 605. The motor 605 may feature a right-angle gearbox that may allow the motor 605 to be tightly fitted up against the control arm 130. In some embodiments, each motor 605 may be individually controlled, allowing them to move in different directions if necessary. This can be the basis, for example, for a differential drive system of the landing platform vehicle 100, in which the wheels 125 on one side of the landing platform vehicle 100 rotate in the opposite direction from those on the other side of the landing platform vehicle 100. This may cause the landing platform vehicle 100 to rotate in place, giving it a small turning radius.

In some embodiments, the drive system may be self-aware. For example, each motor 605 may include a one or two-channel Hall Effect encoder that can send pulses to the digital controller. The frequency of these pulses, for example, may be directly proportional to the speed of the motor 605. The pulses on the two channels may be 90 degrees out of phase with one another, allowing the controller to also determine the direction of rotation of each wheel motor 605. The data from the wheel 125 encoders may allow the controller to detect if any of the wheels 125 are slipping or stalled, that may indicate a problem that may require shutting down one of the drive motors. Various other techniques may be used to allow the drive system to be self-aware.

Figure 7A:
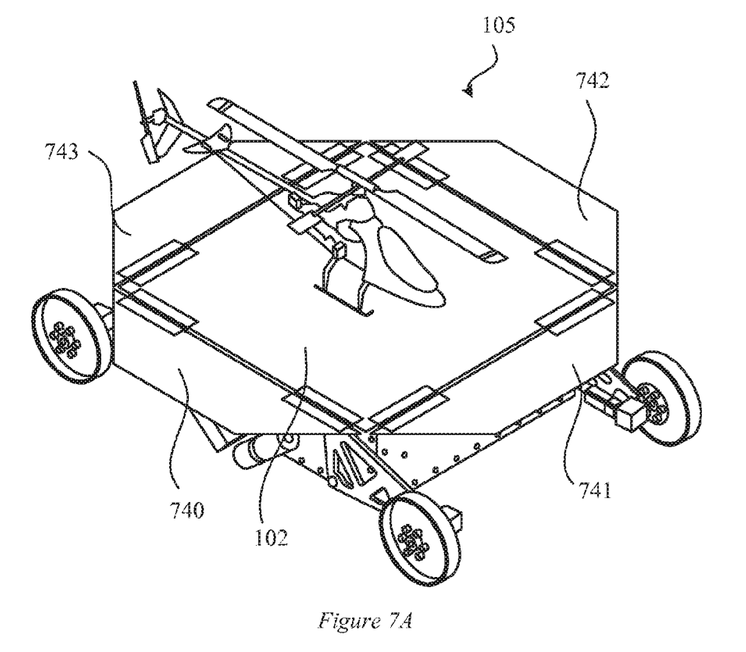
FIGS. 7A and 7B illustrate a collapsible landing surface according to some embodiments.
Figure 7B:
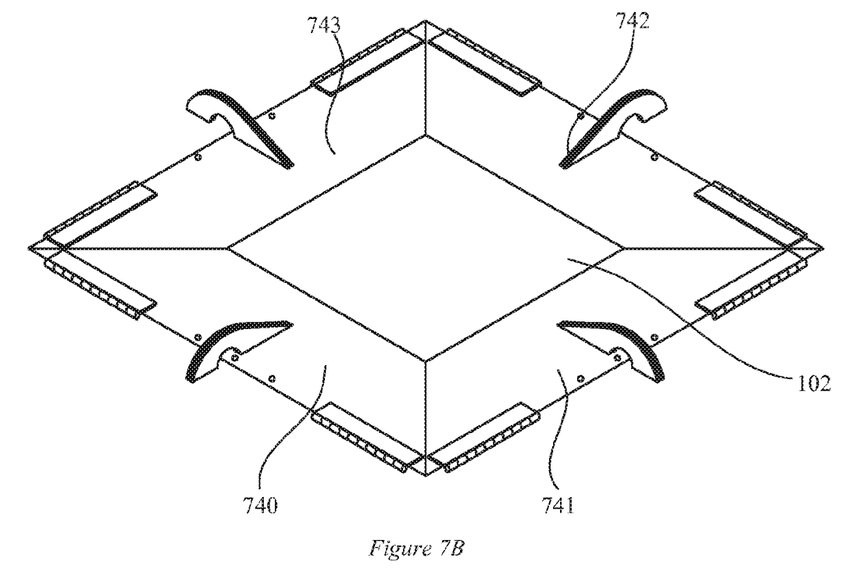

In some embodiments the landing surface 102 of the landing platform vehicle 100 may include one, two, three, four, five or more flaps that may fold outwardly to create a larger surface. FIGS. 7A and 7B illustrate a collapsible landing surface 102 with flap 840, flap 841, flap 842, and/or flap 843. FIG. 7A shows these flaps in an open configuration and FIG. 7B shows these flaps in a closed configuration. By opening the flap 840, flap 841, flap 842, and/or flap 843 the surface area of the landing surface 102 may be increased as shown in FIG. 7A.

In some embodiments, folding the landing surface 102 into the closed configuration may allow for a more compact and/or more durable configuration for transport. In some embodiments, this can be accomplished by rotating four trapezoidal flaps 180 degrees inward so that they rest flat on the center section.

In some embodiments, the landing platform vehicle 100 may be compact enough to be carried on the back of a person without impeding movement. In some embodiments the landing surface 102 may have a surface area of 2-5 square feet, such as, for example, about three square feet. In some embodiments, the landing platform vehicle 100 may have a height of 5-12 inches.

In some embodiments, the landing surface 102 may include eight spring-loaded stainless steel hinges that may force the flaps closed. Two hinges may be coupled with each of the flaps. In some embodiments, the landing surface 102 may use, for example, a motorized cable operated mechanism to pull the landing surface 102 open. This mechanism may use four miniature winches to pull each cable over a cam at the edge of the landing surface 102. For example, the landing surface 102 may be held open without the motors requiring any power; only when the motors may be reversed, is the landing surface 102 allowed to close.

Figure 8:
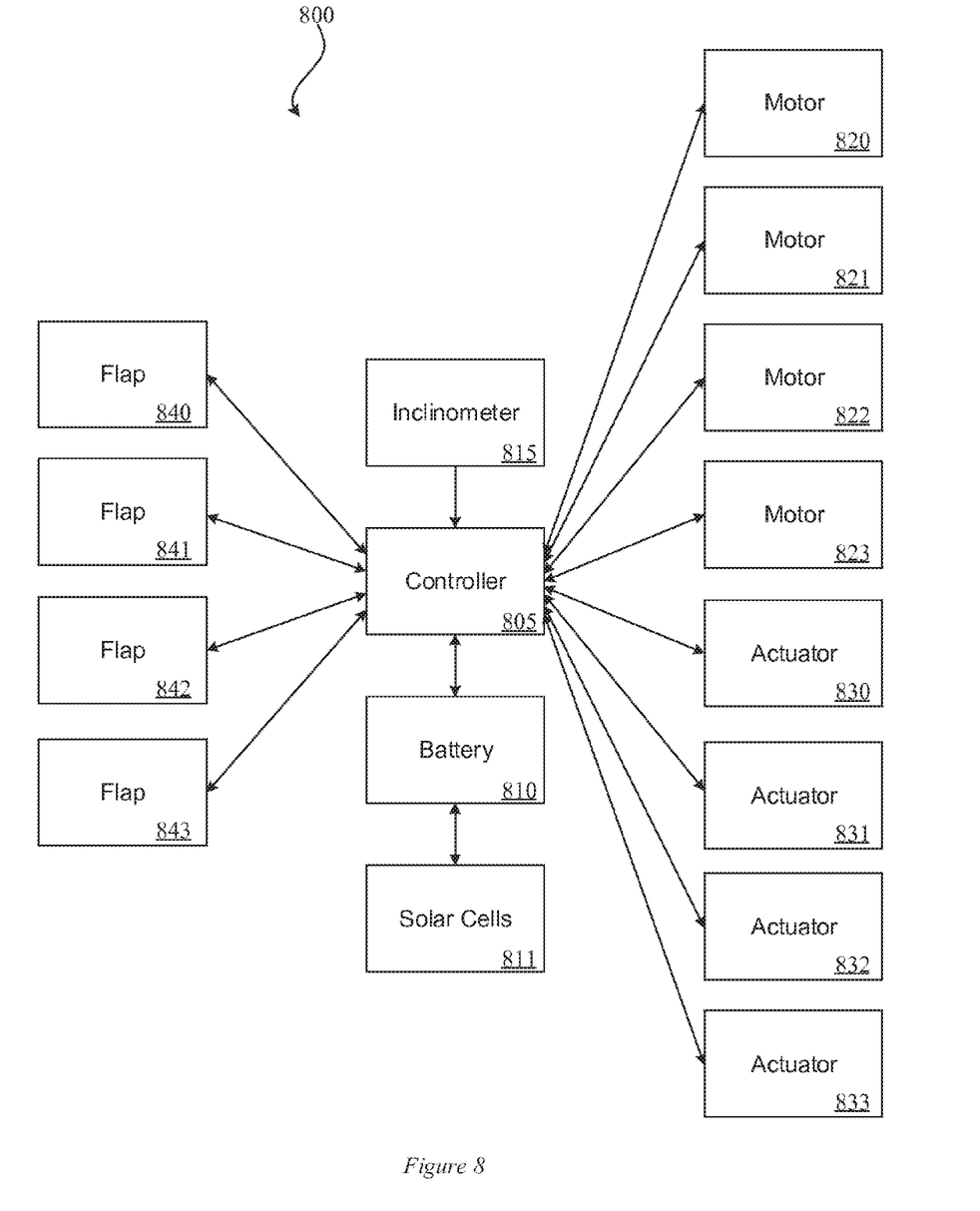
FIG. 8 is a block diagram of a landing platform according to some embodiments.

FIG. 8 is a block diagram of an electronic system 800 of a landing platform vehicle 100 according to some embodiments. The electronic system 800 may include a controller 805, battery 810, and inclinometer 815. The controller 805 may include any type of controller such as, for example, a controller, a processor, an FGPA, etc. The controller 805 may execute algorithms, routines, systems, processes, programs, etc., that receive data from the various components of the electronic system 800 and/or provide control signals to the various components of the electronic system 800. The controller 805, for example, may include any component of computational system 1000 shown in FIG. 10. The battery 810 may include any number of batteries of various types that can provide power to the controller 805 and/or any other component. In some embodiments, every other component or various components shown in FIG. 8 may also be powered by the batteries 810 or other batteries. In some embodiments, the batteries 810 may be electrically coupled with solar cells 811. The solar cells 811, for example, may be coupled with the top surface of the landing surface 102. The solar cells 811 may collect radiation from the sun that is converted to electricity to charge the battery 810. Any number and/or type of solar cells may be used. The solar cells 811 may include various components that may be used to regulate and/or control the charging of the battery 810. The inclinometer 815 may include any type of device that can measure an angle relative to gravity in two dimensions. In some embodiments, two inclinometers may be included—one for each of two orthogonal dimensions. The inclinometer 815 may include, for example, a tilt sensor, an accelerometer, a 2-axis MEMS inclinometer, etc. In some embodiments, the inclinometer may output one or more values of voltage, current, or resistance, which is proportional to the inclination of the inclinometer relative to gravity in one or two axis.

In some embodiments, the controller 805 may be electronically coupled with motor 820, motor 821, motor 822, and/or motor 823 (the motors). Each of the motors may be coupled with a wheel 125 of one of four actuating wheel assemblies. The controller 805, therefore, may control the rotation of each wheel by sending a signal to one of the motors. In some embodiments, a Pulse Width Modulation (PWM) signal may be sent from the controller 805 to one of each of the motors to control the rate of rotation of the motor. In some embodiments, the controller 805 may be electronically coupled with actuator 830, actuator 831, actuator 832, and/or actuator 833 (the actuators). Each of the actuators may be coupled with the body of the landing platform vehicle 100 and a control arm 130 of an actuating wheel assembly. The controller 805, therefore, may control the angle of each control arm 130 relative to the landing platform, which may cause the landing surface 102 to change the ordination of the landing surface 102 relative to gravity. In some embodiments, one or more of the actuators may send a feedback signal to the controller 805 that specifies the position of the actuator and, therefore, the position of the control arm 130 relative to the landing surface 102. In some embodiments, a PWM signal may be sent from the controller 805 to one of each of the motors to control position of each of the actuators. In some embodiments, each of the actuators may send position signals back to the controller 805 that indicate the linear position of each actuator.

In some embodiments, the controller 805 may be electronically coupled with flap 840, flap 841, flap 842, and/or flap 843 (the flaps). An example configuration of these flaps is shown in FIGS. 7A and 7B. The controller 805 may cause the flaps to open or close creating a larger surface area on the landing surface 102 upon which a UAV 105 may land. In some embodiments, each of the flaps may open or close using any number of mechanisms such as, for example, an electronic lock, an electronic latchet, a electromagnet, a pulley and motor system, a linear actuator, a motor and gear system, etc. In some embodiments, the landing platform vehicle 100 may provide high amplitude and/or low frequency leveling compensation. For example, a controller (e.g., controller 805 shown in FIG. 8 and/or the computation system 1000 shown in FIG. 10) may coordinate the actuation of the linear actuators 135 in response to inclination data to ensure that the landing surface 102 is level relative to the horizon. In some embodiments, the landing platform vehicle 100 may adjust the level of the landing surface 102 with three degrees of freedom. In some embodiments, the landing platform vehicle 100 may adjust the level of the landing surface 102 within a ±1%, ±2%, ±3%, ±4%, or ±5% relative to horizontal.

Figure 9:
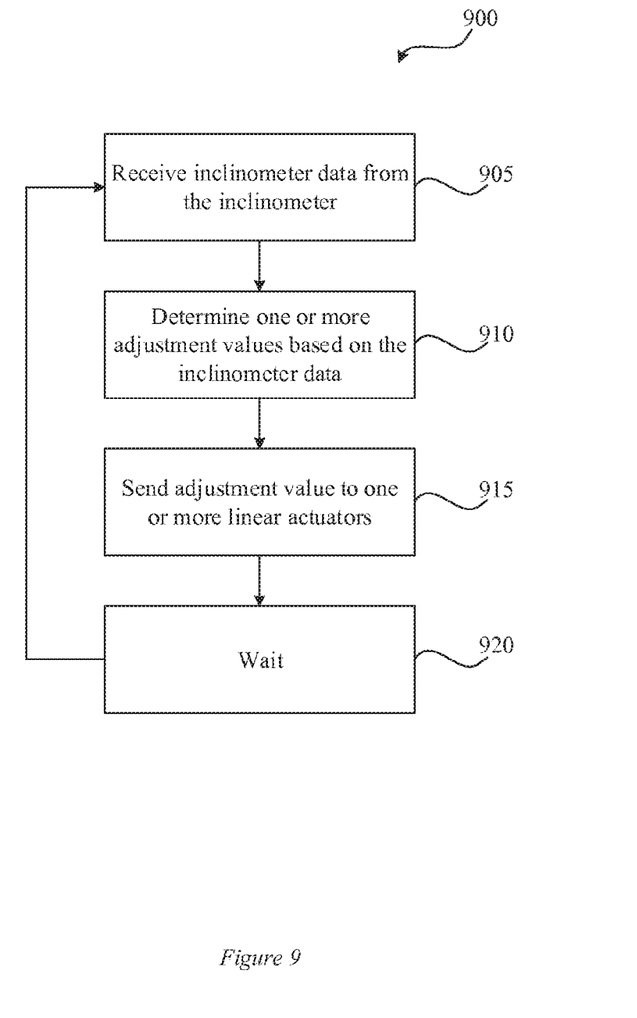
FIG. 9 is a flowchart of a method for self-leveling according to some embodiments.

FIG. 9 is a flowchart of an example process 900 for self-leveling, according to at least one embodiment described herein. One or more steps of the process may be implemented, in some embodiments, by one or more components described herein. Although illustrated as discrete blocks, various blocks may be divided into additional blocks, combined into fewer blocks, or eliminated, depending on the desired implementation. In some embodiments, the process 900 may be executed by controller 805.

At block 905 inclinometer data is received from the inclinometer 815. The inclinometer data may include data representing the angle of incline of the landing surface 102 relative to gravity in one or two dimensions. In some embodiments, inclinometer values may be read from the inclinometer 815. In some embodiments, this may include reading one or more analog voltage values (or current values or resistance values) from the inclinometer 815. In some embodiments, this may include converting an analog voltage value into a digital value.

In some embodiments, control arm position data may also be received from one or more linear actuators 135.

At block 910 one or more adjustment values may be determined based on the inclinometer data. In some embodiments, an adjustment value for a specific linear actuator 135 may depend on the position of one or more control arms 130 relative to the body of the landing platform vehicle 100. In some embodiments, the positions of the respective one or more control arms 130 may be determined based on a position signal received form the one or more linear actuators 135. In some embodiments, an adjustment value may be determined using a look up table that correlates an adjustment value with inclinometer data and/or the position of an actuating arm 136 of the linear actuator 135. In some embodiments, the adjustment value for one linear actuator 135 may be determined based the position of the actuating arms of other linear actuators.

In some embodiments, an adjustment value for a first linear actuator may depend on the position of an actuating arm of a second linear actuator, a third linear actuator, and/or a fourth linear actuator. For example, the inclination data may indicate that a first linear actuator may be actuated to move a portion of the landing platform surface upwards in order to level the landing platform surface. The same inclination data may also indicate that a second linear actuator (and/or a third linear actuator and/or a fourth linear actuator) may be actuated to move a portion of the landing platform downwards in order to level the landing platform surface. The controller 805 may determine whether to actuate the first linear actuator or the second linear actuator in order to level the landing platform surface. For example, if the first linear actuator position is greater than the position of the second linear actuator and/or if the first linear actuator position is greater than a threshold position value (e.g., the first actuator has been actuated past the half way point of actuation) and/or the second linear actuator position is less than a threshold position value (e.g., the second actuator has been actuated past the half way point of actuation) then the second linear actuator may be positively actuated to level the landing platform surface rather than the first linear actuator. Alternatively and/or additionally, as another example, if the first linear actuator position is less than the position of the second linear actuator and/or if the first linear actuator position is less than a threshold position value (e.g., the first actuator has been actuated past the half way point of actuation) and/or the second linear actuator position is greater than a threshold position value (e.g., the second actuator has been actuated past the half way point of actuation) then the first linear actuator may be positively actuated to level the landing platform surface rather than the first linear actuator.

At block 915 the adjustment value may be sent to one or more linear actuators and the one or more linear actuators may actuate according to the adjustment value. In some embodiments, the adjustment signal may be a PWM signal where the frequency of pulses and/or the duration of pulses are proportional to the size of the adjustment value. In some embodiments, the adjustment value may be sent to an actuator control. The actuating controller may send a PWM signal to the actuator.

At block 920 the process 900 may wait a predetermined period of time before returning to block 905. In some embodiments, the predetermined period of time may be proportional with the sampling period of the inclinometer. For example, if the inclinometer is sampled at a rate of 10 Hz, then the process 900 may wait about one tenth of a second at block 920.

Figure 10:
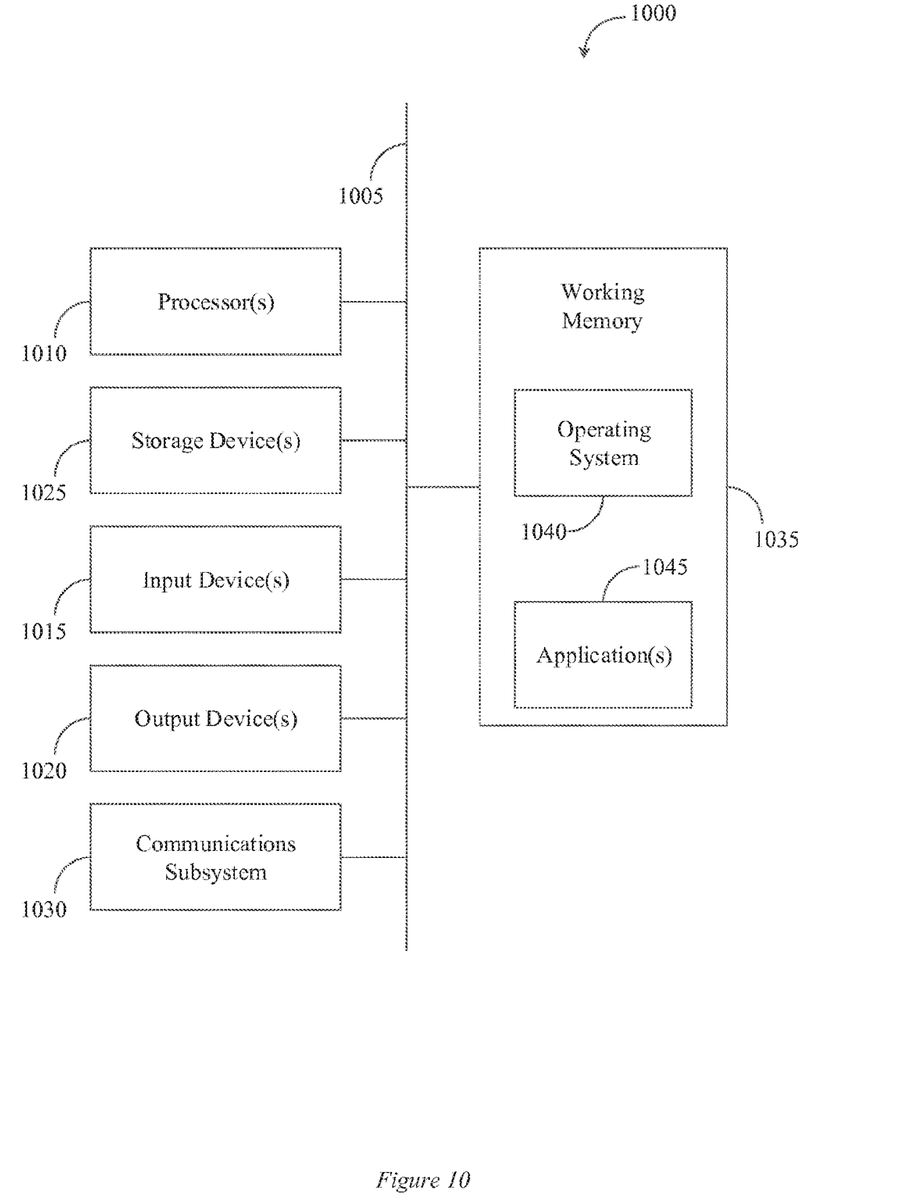
FIG. 10 illustrates a computational system for performing functionality to facilitate implementation of embodiments described herein.

The computational system 1000 (or processing unit) illustrated in FIG. 10 can be used to perform any of the embodiments described within this document. For example, the computational system 1000 can be used alone or in conjunction with other components. As another example, the computational system 1000 can be used to perform any calculation, solve any equation, perform any identification, and/or make any determination described here. For example, the computational system 1000 may be used to control the linear actuators and/or the wheel motors. For example, the computational system 1000 may also be used to operate and/or level the landing platform vehicle 100. The computational system 1000 includes hardware elements that can be electrically coupled via a bus 1005 (or may otherwise be in communication, as appropriate). The hardware elements can include one or more processors 1010, including, without limitation, one or more general-purpose processors and/or one or more special-purpose processors (such as digital signal processing chips, graphics acceleration chips, and/or the like); one or more input devices 1015, which can include, without limitation, a mouse, a keyboard, and/or the like; and one or more output devices 1020, which can include, without limitation, a display device, a printer, and/or the like.

The computational system 1000 may further include (and/or be in communication with) one or more storage devices 1025, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, andior the like. The computational system 1000 might also include a communications subsystem 1030, which can include, without limitation, a modem, a network card (wireless or wired), an infrared communication device, a wireless communication device, and/or chipset (such as a Bluetooth® device, a 802.6 device, a WiFi device, a WiMAX device, cellular communication facilities, etc.), and/or the like. The communications subsystem 1030 may permit data to be exchanged with a network (such as the network described below, to name one example) and/or any other devices described herein. In many embodiments, the computational system 1000 will further include a working memory 1035, which can include a RAM or ROM device, as described above.

The computational system 1000 also can include software elements, shown as being currently located within the working memory 1035, including an operating system 1040 and/or other code, such as one or more application programs 1045, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above. In some cases, the storage medium might be incorporated within the computational system 1000 or in communication with the computational system 1000. In other embodiments, the storage medium might be separate from the computational system 1000 (e.g., a removable medium, such as a compact disc, etc.), and/or provided in an installation package, such that the storage medium can be used to program a general-purpose computer with the instructions/code stored thereon. These instructions might take the form of executable code, which may be executable by the computational system 1000 and/or might take the form of source and/or installable code, which, upon compilation and/or installation on the computational system 1000 (e.g., using any of a variety of generally available compilers, installation programs, compression/decompression utilities, etc.), then takes the form of executable code.

The term "substantially" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm may be a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing." "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A mobile landing platform vehicle comprising:
    a landing platform body;
    a landing platform surface;
    an inclinometer;
    a first actuating wheel assembly including a first wheel, a first control arm coupled with the first wheel, and a first linear actuator coupled with the landing platform body and the first control arm;
    a second actuating wheel assembly including a second wheel, a second control arm coupled with the second wheel, and a second linear actuator coupled with the landing platform body and the second control arm;
    a third actuating wheel assembly including a third wheel, a third control arm coupled with the third wheel, and a third linear actuator coupled with the landing platform body and the third control arm;
    a fourth actuating wheel assembly including a fourth wheel, a fourth control arm coupled with the fourth wheel, and a fourth linear actuator coupled with the landing platform body and the fourth control arm; and
    a controller communicatively coupled with the inclinometer, the first actuator, the second actuator, the third actuator, and the fourth actuator, the controller configured to determine and send at least one adjustment value to the first actuator, the second actuator, the third actuator, and the fourth actuator to maintain a level landing platform surface;
    a first linear actuator controller communicatively coupled with the controller and the first linear actuator;
    a second linear actuator controller communicatively coupled with the controller and the second linear actuator;
    a third linear actuator controller communicatively coupled with the controller and the third linear actuator; and
    a fourth linear actuator controller communicatively coupled with the controller and the fourth linear actuator.

2. The mobile landing platform vehicle as claimed in claim 1, wherein the controller is configured to receive position data from the first linear actuator, the second linear actuator, the third linear actuator, and the fourth linear actuator, wherein the at least one adjustment value is determined based on the position data.

* * * * *